US007675262B2

(12) United States Patent
Broughton

(10) Patent No.: US 7,675,262 B2
(45) Date of Patent: Mar. 9, 2010

(54) BATTERY VOLTAGE REGULATOR

(75) Inventor: David Harry Broughton, Camberley (GB)

(73) Assignee: Silicon Laboratories Inc., Austin, TX (US)

( * ) Notice: Subject to any disclaimer, the term of this patent is extended or adjusted under 35 U.S.C. 154(b) by 544 days.

(21) Appl. No.: 11/414,823

(22) Filed: May 1, 2006

(65) Prior Publication Data

US 2006/0250122 A1 Nov. 9, 2006

(30) Foreign Application Priority Data

May 5, 2005 (GB) ................................ 0509196.2

(51) Int. Cl.
*H02J 7/00* (2006.01)

(52) U.S. Cl. ....................... 320/107; 320/148; 320/163; 323/282; 323/299

(58) Field of Classification Search ................. 320/107, 320/148; 323/238, 282, 300
See application file for complete search history.

(56) References Cited

U.S. PATENT DOCUMENTS 4,174,503 A * 11/1979 Merklinger et al. ......... 330/300
4,213,082 A * 7/1980 Wisner et al. ............... 323/271
4,835,649 A 5/1989 Salerno
5,012,137 A * 4/1991 Muellner ..................... 326/66
5,764,030 A * 6/1998 Gaza .......................... 320/116
6,426,611 B1 * 7/2002 Reeves et al. ............... 323/267
7,453,239 B2 * 11/2008 Suzuki ....................... 320/152
2005/0237035 A1 * 10/2005 Reilly et al. ................ 323/208
2006/0125454 A1 * 6/2006 Chen et al. .................. 323/282
2006/0244460 A1 * 11/2006 Weaver ....................... 324/430

FOREIGN PATENT DOCUMENTS

GB 1434170 7/1974

OTHER PUBLICATIONS

Search Report; GB0509196.2, Aug. 31, 2005; 1 pg.

* cited by examiner

*Primary Examiner*—Edward Tso
*Assistant Examiner*—Arun Williams
(74) *Attorney, Agent, or Firm*—O'Keefe, Egan, Peterman & Enders LLP

(57) ABSTRACT

Disclosed is a voltage regulator having input terminals for connection to a voltage supply, output terminals for supplying power to a circuit at a predetermined maximum supply voltage, and a voltage regulator circuit connecting the input and output terminals. The voltage regulator circuit has a first supply path connecting first input and output terminals, a second supply path connecting the other input and output terminals, and an active component arranged between the first input and output terminals. A feedback control loop connected to a control terminal of the active component is arranged to sense the voltage on the output side of the active component and, when the voltage is above the maximum supply voltage, limit the output voltage to the maximum supply voltage, and, when the voltage is below the maximum supply voltage, signal the active component to pass power from the input terminals to the output terminals.

17 Claims, 3 Drawing Sheets

BATTERY VOLTAGE REGULATOR

CROSS-REFERENCE TO RELATED APPLICATION

This application claims priority to Great Britain patent application no. GB 0509196.2 for a BATTERY VOLTAGE REGULATOR, herein incorporated by reference in its entirety for all purposes.

FIELD OF INVENTION

The invention relates to a voltage regulator and particularly to a voltage regulator that may be used to limit the voltage provided to battery powered equipment.

BACKGROUND OF THE INVENTION

Electronic circuits can be damaged by excess voltage and accordingly a voltage regulator may be used between a power source and a circuit requiring voltage protection. Some electronic circuits continue to function fully when supplied with less than the rated voltage and ideally require that the voltage regulator provides a direct path.

Voltage regulators, by their very nature, are a drain on the main power source. One existing technology is the low drop out regulator (LDO), which provides series voltage regulation with a small voltage difference across the device. Such regulators may be used with a power source whose voltage is only slightly above the rated value of the regulator. Accordingly, such regulators can keep power losses to a minimum during operation.

Certain types of battery operated equipment operate in an intermittent manner, with short bursts of activity interspersed by longer periods of inactivity. For such types of equipment, the sum of the power losses during operation can be much less than the amount of power lost when the device is switched off, in a standby mode or otherwise operating in a state where the circuit is only drawing a small amount of current.

SUMMARY OF THE INVENTION

In one embodiment, a voltage regulator for supplying a rated load current includes a pair of input terminals for connection to a voltage supply and a pair of output terminals for supplying power to a circuit at a predetermined maximum supply voltage. This embodiment also includes a voltage regulator circuit connecting the input terminals to the output terminals, wherein the voltage regulator circuit is arranged to limit the voltage on the output terminals to the predetermined maximum supply voltage when the voltage on the input terminals is above the predetermined maximum supply voltage. The voltage regulator circuit is also arranged to drop less than 4% of the predetermined maximum supply voltage across the regulator when supplying the rated load current when the voltage on the input terminals is below the predetermined maximum supply voltage and to draw less than 0.1% of the rated load current as a quiescent current when the voltage regulator is not supplying current and when the voltage on the input terminals is below the predetermined maximum supply voltage.

In one embodiment of a voltage regulator circuit, the voltage regulator circuit has a first supply path connecting one input terminal to one output terminal and a second supply path connecting the other input terminal to the other output terminal. The voltage regulator circuit includes an active component arranged between input and output terminals, the active component having a control terminal for controlling the active component, the voltage regulator circuit further including a feedback control loop connected to the control terminal of the active component. The feedback control loop is arranged to sense the voltage on the output side of the active component and, when the voltage on the input terminals is above the predetermined maximum supply voltage, to limit the output voltage to the predetermined maximum supply voltage. The feedback control loop is further arranged, when the voltage on the input terminals is below the predetermined maximum supply voltage, to draw less than 0.1% of the rated load current as a quiescent current whether or not the voltage regulator circuit is supplying an output current and to signal the active component to pass power through the active component from the input terminals to the output terminals with a voltage drop of less than or equal to 4% of predetermined maximum supply voltage when supplying the rated load current.

In an embodiment of an electronic circuit for regulating a voltage supply, the circuit has first and second input terminals for connection to the voltage supply and first and second output terminals for supplying a power supply voltage to a circuit. An active component has a first current terminal coupled to the first input terminal, a second current terminal coupled to the first output terminal, and a control terminal. A feedback control loop is coupled to the control terminal of the active component, where the feedback control loop is configured to drive the control terminal to turn on the active component when the power supply voltage is below a predetermined maximum supply voltage output voltage and, when the power supply voltage approaches the predetermined maximum supply voltage, decrease driving the control terminal tending to turn the active component off.

BRIEF DESCRIPTION OF THE DRAWINGS

For a better understanding of the invention, embodiments will now be described, purely by way of example, with reference to the accompanying drawings in which.

DETAILED DESCRIPTION

Figure 1:
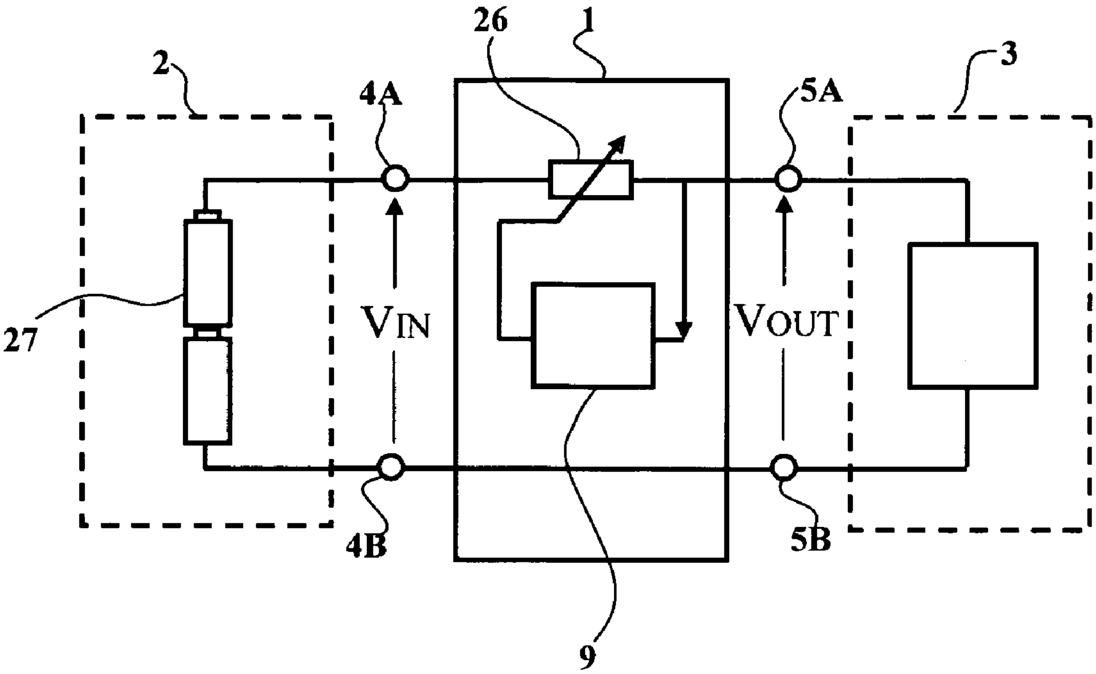
FIG. 1 is a block diagram of a circuit according to an embodiment of the invention having a voltage regulator connected to a voltage source and an output circuit.

Conventional voltage regulators essentially target a predetermined output voltage but very little, if any, attention is given to operation below the predetermined output voltage.

In contrast, the voltage regulator of the present invention regulates the output voltage to the predetermined (target) output voltage when the input voltage is above that voltage, but essentially switches off, drawing a very low quiescent current, when the input voltage is below the predetermined output voltage, and continues to operate down to relatively low voltage levels, down to the turn-off voltage.

Thus, maximum use is made of the input voltage when the input voltage is less than the predetermined value. When the output voltage falls below the predetermined value, the difference between the input and output voltages is very small compared to the actual voltage levels.

The circuit may be used with batteries, for example alkaline batteries, as the power source. The initial voltage level of these batteries will exceed the predetermined voltage and so the regulator needs to operate to reduce the voltage to a safe operating level. As the batteries are depleted, the voltage produced by the battery reduces, eventually falling below the predetermined voltage. Regulation is then no longer necessary and the voltage drop is kept to as low a value as is practical. Any increase in this difference voltage will reduce the useful life of the power source.

In a preferred embodiment, the voltage regulator circuit has a first supply path connecting one input terminal to one output terminal and a second supply path connecting the other input terminal to the other output terminal. The voltage regulator circuit includes an active component arranged between input and output terminals, the active component having a control terminal for controlling the active component. The voltage regulator circuit further includes a feedback control loop connected to the control terminal of the active component, the feedback control loop being arranged to sense the voltage on the output side of the active component. When the voltage on the input terminals is above the predetermined maximum supply voltage, the feedback control loop operates to limit the output voltage to the predetermined maximum supply voltage. When the voltage on the input terminals is below the predetermined maximum supply voltage, the feedback control loop operates to draw less than 0.1% of the rated load current as a quiescent current whether or not the voltage regulator circuit is supplying an output current and to signal the active component to pass power through the active component from the input terminals to the output terminals with a voltage drop of less than or equal to 4% of predetermined maximum supply voltage when supplying the rated load current.

The invention, therefore, can increase the time that battery operated circuits may operate without changing the cells of the battery. The active component may be a FET, or a similar device.

In a preferred implementation, the gate of the FET is connected to the second supply path to keep the voltage of the gate of the FET at the voltage of the second supply path FET turned on in the absence of current flowing in the feedback control loop; and the feedback control loop includes a voltage divider across the output terminals and a transistor circuit that is arranged to provide a feedback current path between the gate of the FET and the first supply path so that as the voltage across the output terminals increases the voltage on the gate of the FET becomes closer to that of the first supply path to tend to turn the FET off as the voltage increases.

In this way the feedback control loop essentially draws little or no current when the input voltage, and hence the output voltage, is below the predetermined output voltage.

The transistor circuit may include: a first bipolar transistor with its base connected to the voltage divider, the emitter connected to the second supply path; and a second transistor with its base connected to the collector of the first transistor, its emitter connected to the first supply path and its collector connected to the gate of the FET.

Such an arrangement with two transistors is able to draw little current even when the feedback loop is operating.

The voltage regulator may include a reverse protection FET on the first supply path between the input terminals and the voltage regulator circuit, the gate of the reverse protection FET being connected to the second supply path.

The reverse protection FET can operate to protect the circuit from reverse input voltages which may occur, for example, if the cells of the battery are inserted with an incorrect polarity.

An alternative protection arrangement uses a forward conducting Schottky diode connected on the first supply path between the input terminals and the voltage regulator circuit.

Preferably, each FET used drops a voltage of less than 40 mV when the input voltage is below the predetermined supply voltage and above the turn-off voltage.

Instead of a linear circuit, the voltage regulator may be based on a pulse width modulation circuit.

The invention is of particular application to the case that the battery operated electronic circuit is a ZigBee circuit. "ZigBee" is a new standard which provides for the interconnection of switches, sensors and activators by means of radio frequency transmissions. The signals are sent on an intermittent basis, with some regularity. Nevertheless, for most of the time only quiescent power is taken.

ZigBee devices may be battery powered and the time between battery renewals is critical to acceptance of the ZigBee standard and its widespread use. Accordingly the power requirements need to be minimized, and the voltage regulator set out above is particularly suitable in this application.

The voltage drop of the voltage regulator circuit may preferably be less than 2%, preferably less than 1% of the predetermined maximum supply voltage when the voltage on the input terminals is below the predetermined maximum supply voltage.

The voltage regulator circuit preferably draws less than 0.04%, further preferably less than 0.02%, of the rated load current as a quiescent current when the voltage regulator is not supplying current and when the voltage on the input terminals is below the predetermined maximum supply voltage.

Referring to FIG. 1, a circuit according to an embodiment of the invention includes a battery power source 2 electrically connected to the two input terminals 4A,4B of voltage regulator 1. A device circuit 3 is electrically connected to the two output terminals 5A,5B of the voltage regulator. The voltage regulator 1 includes active component 26, which must be a device having low ON resistance (low ON voltage drop) and high drive impedance, e.g. a FET in the embodiment shown in FIG. 2, and feedback loop 9 around active component 26.

The active component 26 is able to pass voltage at low loss when the input voltage $V_{IN}$ is less than a predetermined target value $V_{TARGET}$. In this state, the output voltage $V_{OUT}$ is accordingly very similar to the input voltage $V_{IN}$.

When the input voltage $V_{IN}$ is above the predetermined target value $V_{TARGET}$ the feedback loop 9 and active component 26 cooperates to control the output voltage $V_{OUT}$ to be the target value $V_{TARGET}$.

In the embodiment shown in FIG. 1, the battery power source 2 includes a pair of nominal 1.5 V alkali battery cells 27 connected in series. Such cells have an initial voltage output that is typically greater than the nominal amount, so, for example, the total initial voltage $V_{IN}$ is over 3 V. In the example shown, assume that the device circuit 3 has a voltage requirement of 2.4 V, so the target value $V_{TARGET}$ is set to be 2.4 V.

In use, initially the input voltage is above 3 V and the feedback loop 9 and active component 26 cooperate to deliver the required 2.4 V output to the device circuit 3.

As the cells 27 are depleted, the battery voltage drops to a point where the total output voltage falls below the target voltage 2.4 V. In this state, the feedback loop 9 ceases to draw any significant current, for example much less than 40 μA, and in this state the active component 26 simply acts as a low loss pass component ensuring that, as closely as possible, the output voltage $V_{OUT}$ simply matches the input voltage $V_{IN}$.

Although the device circuit 3 requires 2.4 V to operate at full power, the circuit can continue to function, with lesser efficiency, down to about 1.5 V and, accordingly, the low loss pass component 26 allows the circuit to continue to operate for as long as possible while the alkaline battery cells 27 deplete. The feedback loop 9 draws a very low quiescent current in this state further prolonging battery life as much as possible.

The circuit thus differs from prior circuits in that it is designed to continue to operate with minimal loss even when the input voltage is below the required voltage. As far as the inventor is aware, previous voltage regulators have simply attempted to regulate the output voltage without any attention being paid to operation of the circuit when the input voltage is insufficient to deliver that output voltage. Consequently, the invention is suited to applications in which power requirements and the time between battery renewals are of critical importance.

In an exemplary embodiment, the device circuit 3 is a ZigBee device. ZigBee is a new standard which provides for the interconnection of switches, sensors and activators by means of radio frequency transmissions. The signals are sent on an intermittent basis, with some regularity. Nevertheless, for most of the time, only quiescent power is taken and as a result it is the quiescent power requirements that dictate the useful life of the power source. Thus, the use of voltage regulator 1 extends the battery life.

Note that it typically would not be possible simply to connect the device circuit 3 to the battery power source 2 since the initial voltage above 3 V could cause damage to the device circuit. Moreover, as will be explained in more detail below, the voltage regulator circuit also provides protection against the application of a voltage of reverse polarity, as might be caused by mis-insertion of batteries.

Figure 2:
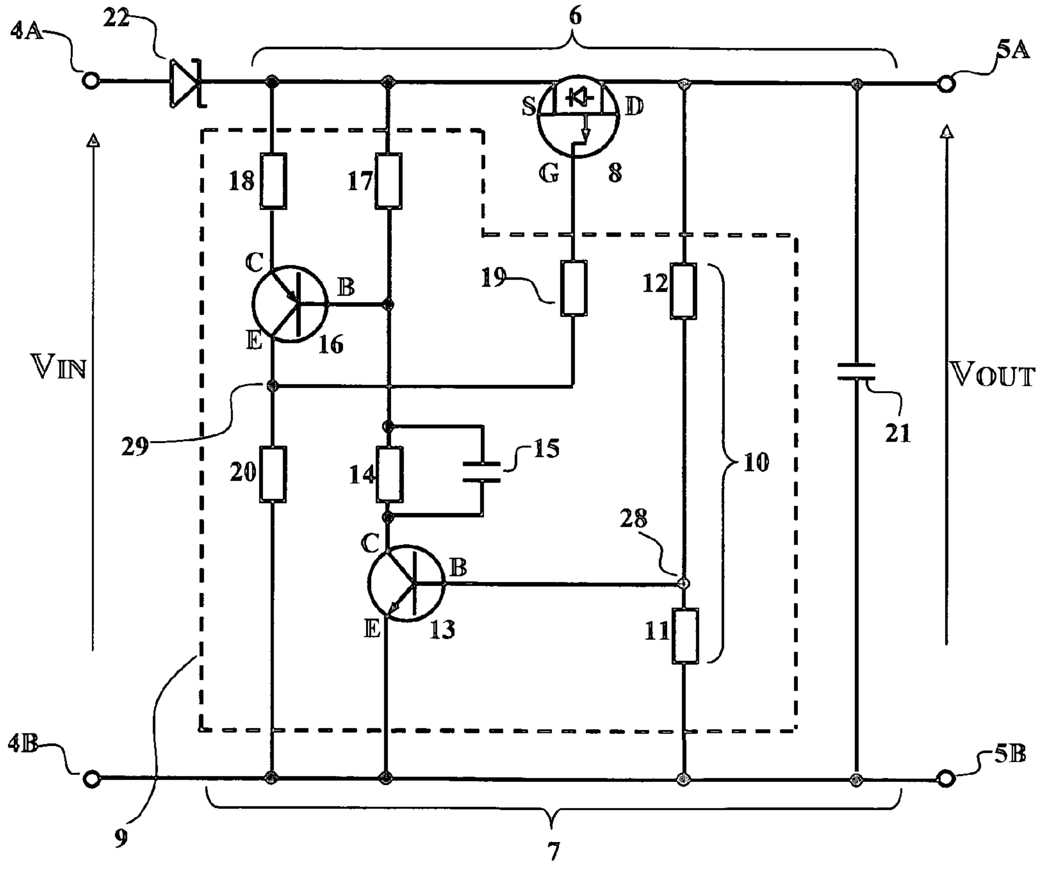
FIG. 2 is a detailed schematic of a voltage regulator according to an embodiment of the present invention.

A specific embodiment of a voltage regulator circuit 1 is shown in FIG. 2. The voltage regulator has a pair of input terminals 4A,4B for connection to a power source 2 and a pair of output terminals 5A,5B for supplying power to device circuitry 3 at a predetermined maximum supply voltage.

One input terminal 4A of the voltage regulator circuit is connected to one output terminal 5A via a first supply path 6 and a second supply path 7 connects the other input terminal 4B to the other output terminal 5B. A P-Type FET 8 is connected in the first supply path 6 between the input and output terminals 4A and 5A, having a source connected to the input terminal 4A, a drain connected to the output terminal 5A and a gate connected to the second supply path 7 through feedback control loop 9.

The feedback control loop 9 includes a resistive voltage divider 10, comprising two resistors 11,12 series-connected between the output terminals 5A,5B, and a transistor circuit that is arranged to provide a feedback current path between the gate of the FET 8 and the first supply path 6.

The transistor circuit includes an NPN bipolar transistor 13 with its base connected to the node 28 between the series resistors 11,12 of the voltage divider 10, the emitter connected to the second supply path 7 and the collector connected in series to a parallel RC high pass circuit 14,15 made up of resistor 14 and capacitor 15 connected in parallel. The parallel RC arrangement is also connected in series to the base of a PNP bipolar transistor 16, the base also being connected to first supply path 6 via a resistor 17. The PNP transistor 16 has its collector connected to the first supply path 6 via a resistor 18 and the emitter connected at node 29 to both the gate of the FET 8 and the second supply path 7 via resistors 19 and 20 respectively.

A capacitor 21 connected between the first and second supply paths 6,7 at the output terminals 5A,5B improves the transient response of the voltage regulator.

The circuit of FIG. 2 may be used for a target voltage of 2.4 V so that it may be fed by a pair of 1.5 V cells in series. In one exemplary embodiment, suitable component values are:

FET 8: L6401
Resistor 11: 220 K
Resistor 12: 820 K
Transistor 13: BC847
Resistor 14: 68 K
Capacitor 15: 0.22 μF
Transistor 16: BC847
Resistor 17: 100 K
Resistor 18: 10 K
Resistor 19: 2.2 K
Resistor 20: 220 K
Capacitor 21: 47 μF The voltage divider 10 senses the output voltage $V_{OUT}$ and supplies a voltage at the base of the bipolar transistor 13. When the output voltage $V_{OUT}$ is below the predetermined target value $V_{TARGET}$, the base-emitter voltage of bipolar transistor 13 at node 28 is below about 0.5 V which is insufficient to turn this transistor on. Feedback control loop 9 is essentially off and the FET 8 held turned on with its gate at the voltage of the second supply path 7. The feedback circuit 9 draws a very low quiescent current, dominated by the series resistance of voltage divider 10 of over 1 MΩ which with 2.4 V across it amounts to only 2.4 μA. Even with the other current flow through transistors 13,16 the total quiescent current drawn by the voltage regulator is much less than 40 μA. In this state the regulator passes the voltage from the power source 2 directly to the output $V_{OUT}$ across the first supply path 6. The voltage drop across FET 8 is less than 40 mV, even when currents as high as 100 mA are being drawn. As such, the current consumption and voltage drop are both at low values, keeping losses to a minimum.

If the output voltage rises above the target voltage the voltage at node 28 rises to 0.5 V and this is enough to provide a small current flow through the base of transistor 13. This is amplified by transistor 13 to provide a larger current flow through transistor 16, the current flow passing through resistor 20. The voltage across resistor 20 thus rises, increasing the voltage at node 29. An increasing voltage here decreases the gate-source voltage ($V_{GS}$) at FET 8, tending to turn the FET off, reducing the output voltage.

As a result of this feedback path, the voltage on the gate of the FET 8 is controlled to limit the output voltage $V_{OUT}$ to the target value $V_{TARGET}$ which is set by the choice of component values in the circuit. The FET 8 and the feedback control loop 9 cooperate to act as a linear regulator to control the output voltage.

Such an arrangement with two transistors is able to draw little current even when the feedback control loop 9 is operating, since the high resistance (220 K) of resistor 20 means that only 10 μA passing through transistor 16 is sufficient to provide a 2.2 V difference in the voltage at node 29.

As will be appreciated, different component choices can be made for different target values. It is preferred that the values of resistor 20 and the voltage divider resistors 11,12 are as large as is practical, to minimise quiescent current.

Preferably, the voltage drop across the FET (8) is kept to as low a value as possible in order to maximise the useful life of the power source. It is preferred that this value be less than 40 mV, for load currents up to 100 mA, when the input voltage $V_{IN}$ is below the predetermined target voltage $V_{TARGET}$ and above the regulator's turn-off voltage.

The voltage regulator circuit illustrated in FIG. 2 also includes a schottky diode 22 connected on the first supply path 6 between the first input terminal 4A and the voltage regulator circuit. This arrangement provides protection to the circuit from reverse polarity input voltages which may occur, for example, if the cells of the battery are inserted with an incorrect polarity.

Figure 3:
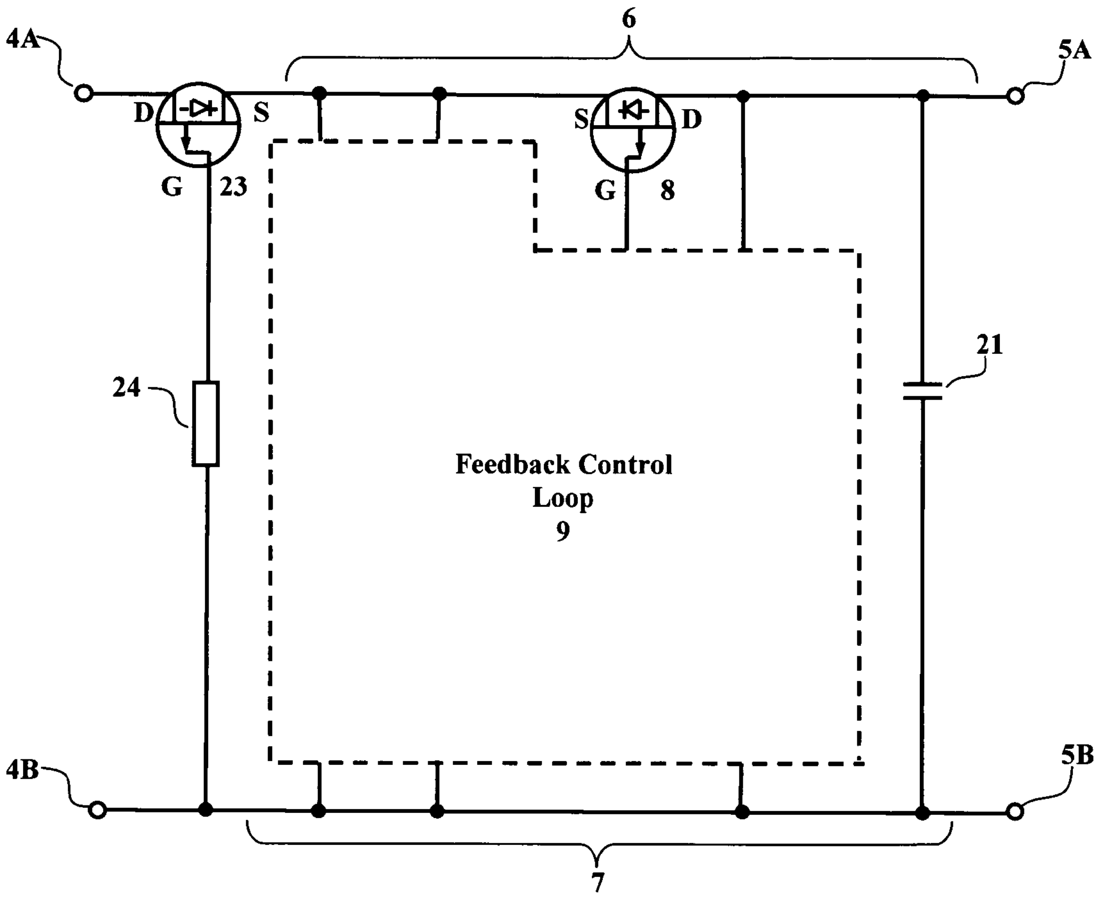
FIG. 3 is a diagram of a voltage regulator according to an alternative embodiment of the present invention.

An alternative embodiment of a voltage regulator 1 is shown in FIG. 3. The feedback control loop 9 is the same as in the arrangement of FIG. 2 and accordingly is not shown in detail in the drawing.

A reverse protection P-Type FET 23 is connected on the first supply path 6 between the first input terminal 4A and the voltage regulator circuit, the gate of the reverse protection P-Type FET 23 being connected to the second supply path 7 through a resistor 24. It is noted that the source and drain connections of the FET 23 are reversed from the usual mode of operation. This is to ensure that the internal diode remains reversed-biased during the application of a negative voltage. When a negative voltage is applied at the power source 2, the gate-source voltage ($V_{GS}$) becomes positive and the FET 23 turns off, preventing power flow in the first supply path 6. Accordingly, this preferred arrangement provides reverse voltage protection with almost loss-less forward transmission of power.

Another embodiment of the invention, which is not shown, is to place the voltage regulator 1 on a dedicated silicon chip. Although the actual implementation would depend upon the chip designer, it is possible to replace the bipolar transistors 13, 16 with very low power operational amplifiers. These would provide higher gain, sharper selection of maximum output voltage $V_{OUT}$, and better transient response.

It is appreciated that, as with all series regulator devices, short circuit protection and thermal overload protection should be provided. Provision of these features has not been detailed in the description of the embodiments and the addition of these features should be straightforward to persons skilled in the art.

The invention is not limited to the embodiments described above and those skilled in the art will readily arrive at alternative embodiments. In particular, the voltage and current values may be varied as required in individual circumstances and suitable components chosen on the basis of a trade-off between cost and performance.

Although the invention has been described with reference to alkaline batteries it is applicable also to other kinds of batteries and alternative power sources such as fuel cells.

Further modifications could include the use of a threshold voltage, to indicate the power source is getting low, and application of Pulse Width Modulation control in voltage regulation mode, possibly providing more efficient voltage regulation. Those skilled in the art will readily observe such modifications and alterations are numerous and may be made while retaining the teachings of the invention.

The invention claimed is:

1. A voltage regulator for supplying a rated load current, comprising:

a pair of input terminals for connection to a voltage supply;

a pair of output terminals for supplying power to a circuit at a predetermined maximum supply voltage;

a voltage regulator circuit connecting the input terminals to the output terminals, wherein the voltage regulator circuit is arranged:

to limit the voltage on the output terminals to the predetermined maximum supply voltage when the voltage on the input terminals is above the predetermined maximum supply voltage;

to drop less than 4% of the predetermined maximum supply voltage across the regulator when supplying the rated load current when the voltage on the input terminals is below the predetermined maximum supply voltage; and to draw less than 0.1% of the rated load current as a quiescent current when the voltage regulator is not supplying current through the output and when the voltage on the input terminals is below the predetermined maximum supply voltage.

2. A voltage regulator according to claim 1, wherein:

the voltage regulator circuit has a first supply path connecting one input terminal to one output terminal and a second supply path connecting the other input terminal to the other output terminal; and the voltage regulator circuit includes an active component arranged between input and output terminals, the active component having a control terminal for controlling the active component, the voltage regulator circuit further including a feedback control loop connected to the control terminal of the active component, the feedback control loop being arranged:

to sense the voltage on the output side of the active component, when the voltage on the input terminals is above the predetermined maximum supply voltage, to limit the output voltage to predetermined maximum supply voltage, and when the voltage on the input terminals is below the predetermined maximum supply voltage, to draw less than 0.1% of the rated load current whether or not the voltage regulator is supplying current and to signal the active component to pass power through the active component from the input terminals to the output terminals with a voltage drop of less than or equal to 4% of predetermined maximum supply voltage when supplying the rated load current.

3. A voltage regulator according to claim 2 wherein the active component is a FET with its gate connected to the feedback loop and with its source and drain connected on the first supply path.

4. A voltage regulator according to claim 3 wherein:

the gate of the FET is connected to the second supply path to keep the voltage of the gate of the FET at the voltage of the second supply path FET turned on in the absence of current flowing in the feedback control loop; and the feedback control loop includes a voltage divider across the output terminals and a transistor circuit that is arranged to provide a feedback current path between the gate of the FET and the first supply path so that as the voltage across the output terminals increases the voltage on the gate of the FET becomes closer to that of the first supply path and tends to turn the FET off as the voltage increases.

5. A voltage regulator according to claim 4 wherein the transistor circuit includes:

a first bipolar transistor with its base connected to the voltage divider, the emitter connected to the second supply path; and a second transistor with its base connected to the collector of the first transistor, its emitter connected to the first supply path and its collector connected to the gate of the FET.

6. A voltage regulator according to claim 5 further comprising a reverse protection FET on the first supply path between the input terminals and the voltage regulator circuit, the gate of the reverse protection FET being connected to the second supply path.

7. A voltage regulator according to claim 5 further comprising a Schottky protection diode connected on the first supply path between the input terminals and the voltage regulator circuit.

8. A voltage regulator according to claim 2 wherein the active component drops a voltage of less than 40 mV when the input voltage is below the predetermined supply voltage and above a predetermined turn-off voltage.

9. A voltage regulator according to claim 1 wherein the voltage regulator circuit is a pulse width modulation circuit.

10. A battery operated circuit including:
at least one battery cell;
an electronic circuit; and
a voltage regulator connecting the at least one battery cell to the electronic circuit wherein:
the voltage regulator circuit has a first supply path connecting one input terminal to one output terminal and a second supply path connecting the other input terminal to the other output terminal; and
the voltage regulator circuit includes an active component arranged between input and output terminals, the active component having a control terminal for controlling the active component, the voltage regulator circuit further including a feedback control loop connected to the control terminal of the active component, the feedback control loop being arranged:
to sense the voltage on the output side of the active component,
when the voltage on the input terminals is above the predetermined maximum supply voltage, to limit the output voltage to the predetermined maximum supply voltage, and
when the voltage on the input terminals is below the predetermined maximum supply voltage, to signal the active component to pass power through the active component from the input terminals to the output terminals.

11. A battery operated circuit according to claim 10 wherein the electronic circuit is a ZigBee circuit.

12. A circuit for supplying a rated load current, the circuit comprising:
a pair of input terminals for connection to a voltage supply;
a pair of output terminals for supplying power to a circuit at a predetermined maximum supply voltage; and
a voltage regulator circuit having a first supply path connecting one input terminal to one output terminal and a second supply path connecting the other input terminal to the other output terminal, where the voltage regulator circuit includes:
an active component arranged between the input and output terminals, the active component having a control terminal for controlling the active component, and
a feedback control loop connected to the control terminal of the active component, the feedback control loop including:
means for sensing the voltage on the output side of the active component,
means for limiting the output voltage to the predetermined maximum supply voltage when the voltage on the input terminals is above the predetermined maximum supply voltage, and
means for signalling the active component to pass power through the active component from the input terminals to the output terminals when the voltage on the input terminals is below the predetermined maximum supply voltage.

13. An electronic circuit for regulating a voltage supply, the circuit comprising:
first and second input terminals for connection to the voltage supply;
first and second output terminals for supplying a power supply voltage to a circuit;
an active component having a first current terminal coupled to the first input terminal, a second current terminal coupled to the first output terminal, and a control terminal;
a feedback control loop coupled to the control terminal of the active component, the feedback control loop being configured to drive the control terminal to turn on the active component when the power supply voltage is below a predetermined maximum supply voltage output voltage and, when the power supply voltage approaches the predetermined maximum supply voltage, decrease driving the control terminal tending to turn the active component off.

14. The electronic circuit of claim 13, where the feedback control loop further comprises:
a voltage divider coupled between the first and second output terminals and having a node that supplies a sense voltage related to the power supply voltage;
a first transistor coupled between the first and second input terminals and configured to drive the control terminal of the active component; and
a second transistor coupled between the first and second input terminals and configured to control the first transistor, where the second transistor controls the first transistor responsive to the sense voltage.

15. The electronic circuit of claim 14, wherein:
the active component is a p-type field effect transistor (FET) having a source, drain and gate, where the source is the first current terminal coupled to the first input terminal, the drain is the second current terminal coupled to the first output terminal, and the gate is the control terminal;
the first transistor is a pnp device having a base, collector and emitter, where the collector is coupled to the first input terminal through a first resistor and the emitter is coupled to the second input terminal through a second resistor and is coupled to the gate of the FET through a third resistor; and
the second transistor is a npn device having a base, collector and emitter, where the emitter is coupled to the second input terminal, the base is coupled to the node of the voltage divider, and the collector is coupled to the first input terminal through a fourth transistor and is coupled to the base of the first transistor.

16. The electronic circuit of claim 15, where the circuit further comprises a high pass filter interposed the base of the first transistor and the collector of the second transistor.

17. The electronic circuit of claim 13, where the circuit further comprises a rectifier interposed the first input terminal and the first current terminal of the active component.

* * * * *